(12) United States Patent
Yamamoto et al.

(10) Patent No.: US 7,170,263 B2
(45) Date of Patent: Jan. 30, 2007

(54) METHOD AND APPARATUS FOR CONTROLLING ON-VEHICLE GENERATOR

(75) Inventors: Takaaki Yamamoto, Kariya (JP); Fuyuki Maehara, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/357,055

(22) Filed: Feb. 21, 2006

(65) Prior Publication Data

US 2006/0186863 A1 Aug. 24, 2006

(30) Foreign Application Priority Data

Feb. 21, 2005 (JP) .............................. 2005-044185

(51) Int. Cl.
*H02K 7/00* (2006.01)
(52) U.S. Cl. ........................ 322/59; 322/28; 322/60; 322/66; 322/10; 290/46; 290/40 R; 290/41
(58) Field of Classification Search ................. 322/28, 322/59, 60, 66, 10; 290/46, 40 R, 41
See application file for complete search history.

(56) References Cited

U.S. PATENT DOCUMENTS

| | | | | |
|---|---|---|---|---|
| 3,902,073 A | * | 8/1975 | Lafuze | 290/46 |
| 4,330,743 A | * | 5/1982 | Glennon | 322/10 |
| 4,636,706 A | * | 1/1987 | Bowman et al. | 322/28 |
| 5,319,299 A | * | 6/1994 | Maehara | 322/28 |
| 6,049,196 A | * | 4/2000 | Arai et al. | 322/61 |
| 6,326,702 B1 | * | 12/2001 | Yonekura et al. | 290/40 C |
| 6,664,651 B1 | * | 12/2003 | Kotre et al. | 290/29 |
| 6,900,618 B2 | * | 5/2005 | Maehara | 322/28 |
| 7,015,594 B2 | * | 3/2006 | Asada | 290/40 R |
| 2004/0135374 A1 | | 7/2004 | Maehara | |

FOREIGN PATENT DOCUMENTS

| | | |
|---|---|---|
| JP | A 2003-284257 | 10/2003 |
| JP | A 2004-208342 | 7/2004 |

* cited by examiner

*Primary Examiner*—Nicholas Ponomarenko
*Assistant Examiner*—Iraj Mohandesi
(74) *Attorney, Agent, or Firm*—Oliff & Berridge, PLC (57) ABSTRACT

An apparatus for controlling an on-vehicle generator is provided. The apparatus comprises a switching element, current detecting unit, setting unit and driving unit. The switching unit turns on/off an exciting current to an exciting winding of the generator, the switching element being driven responsively to a driving signal having an adjustable duty ratio. The setting unit sets the duty ratio based on (i) a difference between an output voltage of the generator and a target voltage value and (ii) a condition in which an electric load is disconnected from the generator, wherein the duty ratio is allowed to lower than a minimum value of the duty ratio depending on a generated state of the generator. The minimum value allows the exciting current to flow at a lower limit detectable by the current detecting unit, The driving unit drives the switching element based on the driving signal.

13 Claims, 11 Drawing Sheets

METHOD AND APPARATUS FOR CONTROLLING ON-VEHICLE GENERATOR

CROSS REFERENCE TO RELATED APPLICATION

The present application is based on and claims priority from Japanese Patent Application No. 2005-044185 filed on Feb. 21 2005, the disclosure of which is incorporated herein by reference.

BACKGROUND OF THE INVENTION

1. Technical Field of the Invention

The present invention relates to an apparatus for controlling the drive of a generator mounted on a vehicle in order to regulate an output voltage of the generator, and in particular, to the apparatus in which control is made on an exciting current to flow through an exciting winding of the generator.

2. Related Art

Various types of apparatuses for controlling the drive of on-vehicle generators have been known. One type of such control apparatus is proposed by Japanese Patent Laid-open (unexamined) Publication No. 2003-284257 and U.S. Pat. No. 6,900,618 B2. According to these publications, the control apparatus detects an excitation current and the number of engine revolutions, calculates a generation torque, and controls an exciting current so that deviations in the generation torque is kept under a predetermined value. This control allows the revolutions of the engine to be kept in a stable state thereof.

However, in this control apparatus, the exciting current is detected by monitoring a voltage across a resistor connected in series to the exciting winding during a period during which a transistor for driving the exciting current to control a current flow through the exciting winding is in on state. In cases where a large power-consuming electric load, which has been electrically connected to an on-vehicle battery system (that is, to the on-vehicle generator), is electrically disconnected from the battery system, the period during which the above transistor is in an off state becomes longer. The longer such a period during which the transistor is in an off state, the more difficult the exciting current detected in real time. Therefore, in such a case, the detection of the exciting current becomes inaccurate, causing various types of control on the detected exciting current to be done in an inaccurate manner.

Specifically, the detected exciting current is temporarily stored and, if the foregoing longer off state of the transistor occurs, the value of the exciting current, which was detected last time before the electric disconnection of the load, is subjected the control. The exciting current decreases depending on the time constant of the exciting winding. This decrease will thus increase a difference between values of the detected and actual exciting currents, thereby decreasing accuracy in detecting the exciting current. As a result, the detected exciting current will not lead to an accurate calculation of a torque to be generated, with the result that the engine cannot be controlled properly.

A technique for preventing such a decrease in the accuracy in detecting the exciting current is provided, as a vehicle generation control apparatus, by Japanese Patent Laid-open Publication No. 2004-208342 (corresponding to U.S. Patent Application Publication No. 2004/0135374A1). This publication provides the technique that the duty of an exciting current for driving is kept at a minimum value for a predetermined period of time, even when a large capacity electric load is electrically disconnected from the battery system.

In the above vehicle generation control apparatus, the minimum duty is set to, for example, a predetermined value of 3% or more, which allows the exciting current to be detected by an exciting current detector. This setting thus makes it possible to detect the value of the actual exciting current at intervals with an improved accuracy.

However, the above minimum-duty technique is confronted with another drawback. That is, since the vehicle control generation apparatus is obliged to maintain the exciting current at a minimum duty or more at any time, the output voltage of the vehicle generator will increase to invite an excessive voltage state when being rotated at a high speed. Alternatively, it may take time until the output voltage decreases below a predetermined regulated voltage.

SUMMARY OF THE INVENTION

The present invention has been made in consideration of the above drawbacks and provides a method and apparatus for controlling an on-vehicle generator, which are able to detect an exciting current with precision even when the output voltage of the generator shows a sharp rise due to, for example, an electric disconnection of an electric load from a power system including the generator and to make the raised output voltage decay as quickly as possible.

In order to achieve the above object, as one aspect, the present invention provides an apparatus for controlling a generator mounted on a vehicle, the generator being electrically connected to an electric load and being equipped with an exciting winding to which an exciting current is supplied for drive of the generator. This the apparatus comprises a switching element placed to turn on and off the exciting current to the exciting winding of the generator, the switching element being driven in response to a driving signal having an adjustable duty ratio; a current detecting unit detecting information showing the exciting current; a setting unit setting the duty ratio of the driving signal on the basis of (i) a difference between a voltage value relating to an output voltage of the generator and a target voltage value and (ii) a condition in which the electric load is electrically disconnected from the generator, wherein the duty ratio is allowed to be lower than a minimum value of the duty ratio depending on a generated state of the generator, the minimum value of the duty ratio allowing the exciting current to flow at a lower limit detectable by the current detecting unit; and a driving unit for driving the switching element based on the driving signal set by the setting unit.

Preferably, the generated state of the generator, which is reflected in setting the duty ratio of the driving signal that is set by the setting unit, is at least one of the exciting current, a decay speed of the exciting current and the number of rotations of the generator.

Still preferably, the voltage value relating to the output voltage of the generator is either the output voltage itself or a voltage that has a correlation with the output voltage.

It is also preferable that the setting unit includes means for determining whether or not the exciting current is smaller than the lower limit value and means for performing either a reduction in the duty ratio of the driving signal down to a value lower than the minimum value or a stop of the driving signal, in cases where it is determined that the exciting current is smaller than the lower limit value.

As another aspect of the present invention, there is provided an apparatus for controlling a generator mounted on a vehicle, the generator being equipped with an exciting winding to which an exciting current is supplied in an on/off manner for driving the generator, the apparatus comprising: a voltage detecting unit for detecting an increase in an output voltage of the generator; a setting unit for setting a driving signal having a duty ratio equal to or lower than a minimum value when the voltage detecting unit detects the increase in the output voltage of the generator, the minimum value of the duty ratio corresponding to a lower limit of the exciting current that is detectable by the detecting unit; and a driving unit for driving the generator by using the driving signal.

As another aspect of the present is directed to a method of controlling a generator mounted on a vehicle, the generator being equipped with an exciting winding to which an exciting current is supplied in an on/off manner for driving the generator, comprising steps of: detecting, at intervals, an increase in an output voltage of the generator; setting a driving signal having a duty ratio equal to or lower than a minimum value when the increase in the output voltage of the generator is detected, the minimum value of the duty ratio corresponding to a lower limit of the exciting current that is detectable; and driving the generator by using the driving signal currently set.

BRIEF DESCRIPTION OF THE DRAWINGS

Other objects and features of the present invention will become more readily apparent from the following detailed description of the preferred embodiments taken in conjunction with the accompanying drawings in which.

DETAILED DESCRIPTION OF PREFERRED EMBODIMENTS

An embodiment of an on-vehicle generation control apparatus according to the present invention will now be described with reference to the accompanying drawings.

Referring to FIGS. 1–5, the on-vehicle generation control apparatus according to the embodiment will now be described.

Figure 1:
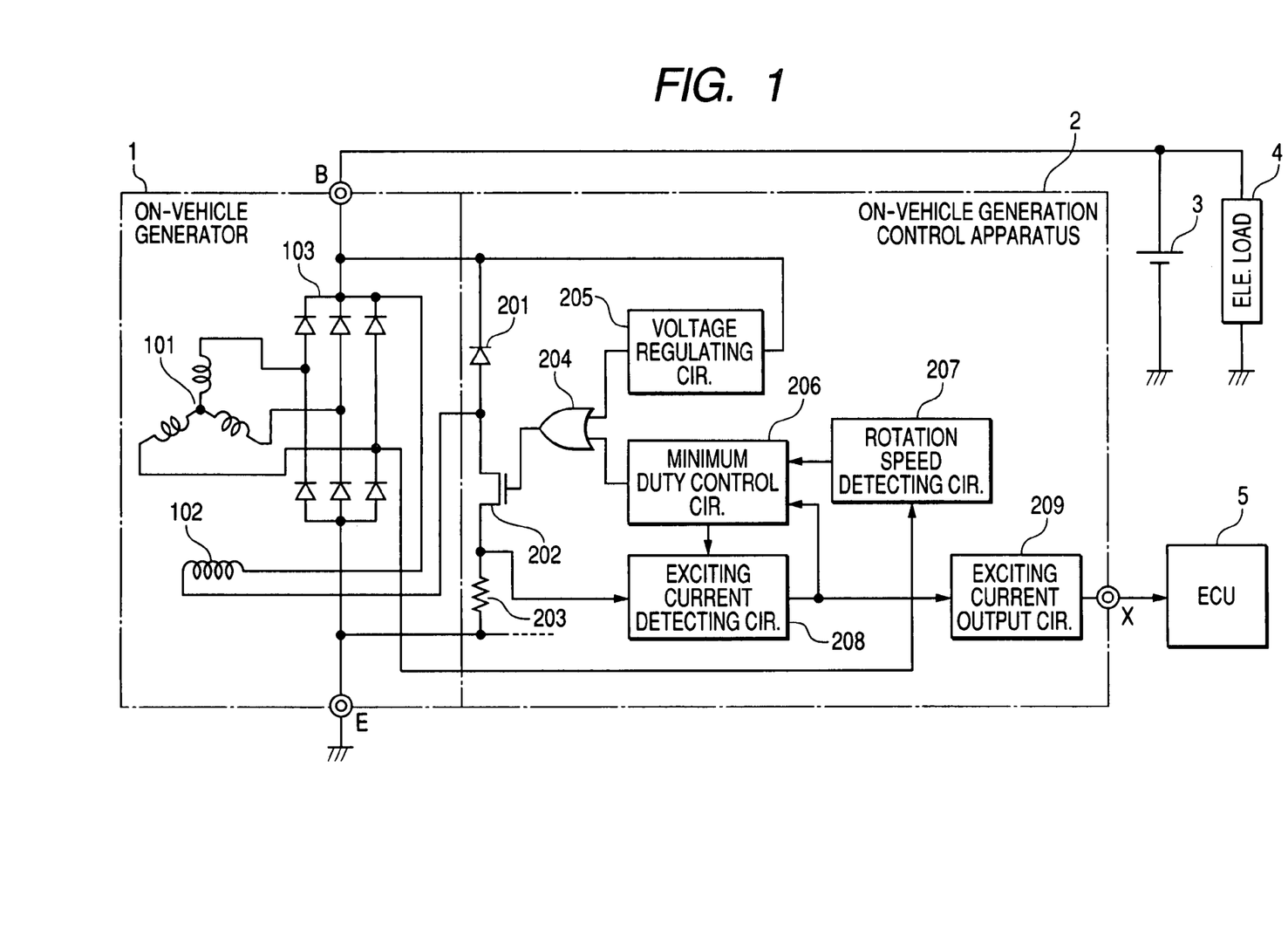
FIG. 1 is a circuit diagram, partly depicted in a block form, showing the arrangement of a generation control apparatus for use in a vehicle according to an embodiment of the present invention.

FIG. 1 shows the arrangement of a generator 1 and a generation control apparatus 2 both adopted by the embodiment, in which both of the generator 1 and the generation control apparatus 2 are mounted on a vehicle or are to be mounted on a vehicle. This arrangement on the vehicle involves a battery 3, an electric load(s) 4, and an ECU (electric control unit) 5 communicably connected to an engine mounted on the vehicle. In the embodiment, the electric load 4 is described as being an electric component which requires a large amount of power, such as an air conditioner.

The generation control apparatus 2 is provided such that a voltage at an output terminal (B terminal) of the generator 1 is regulated at a predetermined voltage value, for example, 14 V. The generator 1 comprises a three-phase stator winding 101 wound around a stator (not shown), an exciting winding 102 wound around a rotor (not shown), and a rectifying circuit 103 for full-wave rectification on outputs voltage from the three phase stator winding 101.

The output voltage of the generator 1 is controlled such that the generation control apparatus 2 turns on/off a current flowing through the exciting winding 102 in a controlled manner. The B terminal of the generator 1 is connected to both of the battery 3 and the electric load 4 so as to supply charge-up current to the battery 4 and/or operation current to the electric load 4. The generator 1 has an output shaft mechanically coupled with the engine via a pulley and a belt, though not shown in detail. The generation control apparatus 2 is communicably connected to the ECU 5 via a communication terminal X.

As shown in FIG. 1, the generation control apparatus 2 is provided with a reflux diode 201, an exciting current driving transistor 202, a sense resistor 203, an OR circuit 204, a voltage regulating circuit 205, a duty ratio control circuit which serves as one of essential parts for duty ratio control according to the present invention, a rotation speed detecting circuit 207, an exciting current detecting circuit 208, and an exciting current output circuit 209, all of which will now be detailed thereinafter.

The exciting current driving transistor 202 is connected in series to the exciting winding 102 so as to supply an exciting current to the exciting winding 102 every time when the transistor 202 is made to turn on. The reflux diode 201 is connected in parallel to the exciting winding 102 so as to reflux the exciting current, when the transistor 202 is made to turn off.

The sense resistor 203 is inserted between a source of the transistor 202 and an earth terminal (E terminal), so that the exciting current flowing through the exciting winding 102 can be detected, provided that the transistor 202 is turned on and the exciting current is allowed to flow by a detectable amount.

The OR circuit 204 has one output terminal electrically connected to a gate of the transistor 202. The output of the OR circuit 204 is in charge of performing a logical OR calculation on two input signals. One input signal is an output signal of the voltage regulating circuit 205 and the other input signal is an output signal of the minimum duty control circuit 206.

The voltage regulating circuit 205 that the configuration of generating and outputting a voltage control signal of a PWM (Pulse Wave Modulation) form which is formed a train of pulses generated at specified intervals (such as 5 ms), so that the output voltage of the generator 1 is regulated at a predetermined value.

The minimum duty control circuit 206 generates a duty signal which has the same interval of time as that of the voltage control signal generated by the voltage regulating circuit 205. The OR circuit 204 has two input terminals that receive both of the voltage control signal from the voltage regulating circuit 205 and the duty signal from the minimum duty control circuit 206.

During the electric load 4 is electrically connected to the generator 1 and in operation, that is, a battery system made up of both the battery 3 and the generator 1, the OR circuit is able to output a driving signal which is the same in waveforms as the voltage control signal coming from the voltage regulating circuit 205. The reason is that the voltage control signal, which is processed on the pulse width modulation, is larger in a duty ratio (or duty cycle) than the duty signal coming from the minimum duty control circuit 206. Accordingly, the transistor 202 is driven by the driving signal whose duty ratio is the same as that controlled by the voltage regulating circuit 205. That is, during the operation of the electric load 4, the transistor 202 can be driven by the voltage regulating circuit 205.

A technique of setting a duty signal in the minimum duty control circuit 206 will be described later.

The rotation speed detecting circuit 207 is formed to detect the number of rotations (the rotation number) of the generator 1 based on the first phase voltage of the stator winding 101. Thus a signal indicative of (e.g., which is proportional to) the number of rotations can be detected. This detected signal is fed to the minimum duty control circuit 206 for examining the rotations of the generator 1.

The exciting current detecting circuit 208 is formed so that it detects the exciting current flowing though the exciting winding 102. By this detection, a signal indicating the amplitude of the exciting current can be detected and provided to both the exciting current output circuit 209 and the minimum duty control circuit 206.

More concretely, the sense resistor 203 is electrically connected in series to the exciting winding 102 via the exciting driving transistor 202, thereby making the exciting current detecting circuit 208 to detect a voltage Vif appearing across the resistor 203. Suppose that the sense resistor 203 has a resistance R. The detecting circuit 208 therefore can be formed such that the calculation of If (=Vif/R) is performed to detect the amount (e.g., amplitude) of the exciting current If to flow through the exciting winding 102. This detection of the exciting current is possible, provided the transistor 202 is driven in a turn on/off manner and the amount of the exciting current is equal to or over a lower limit.

The exciting current output circuit 209 is configured to communicate with the ECU 5 via the X terminal, after converting a detected exciting current signal into a proper format to meet this communication.

Figure 3:
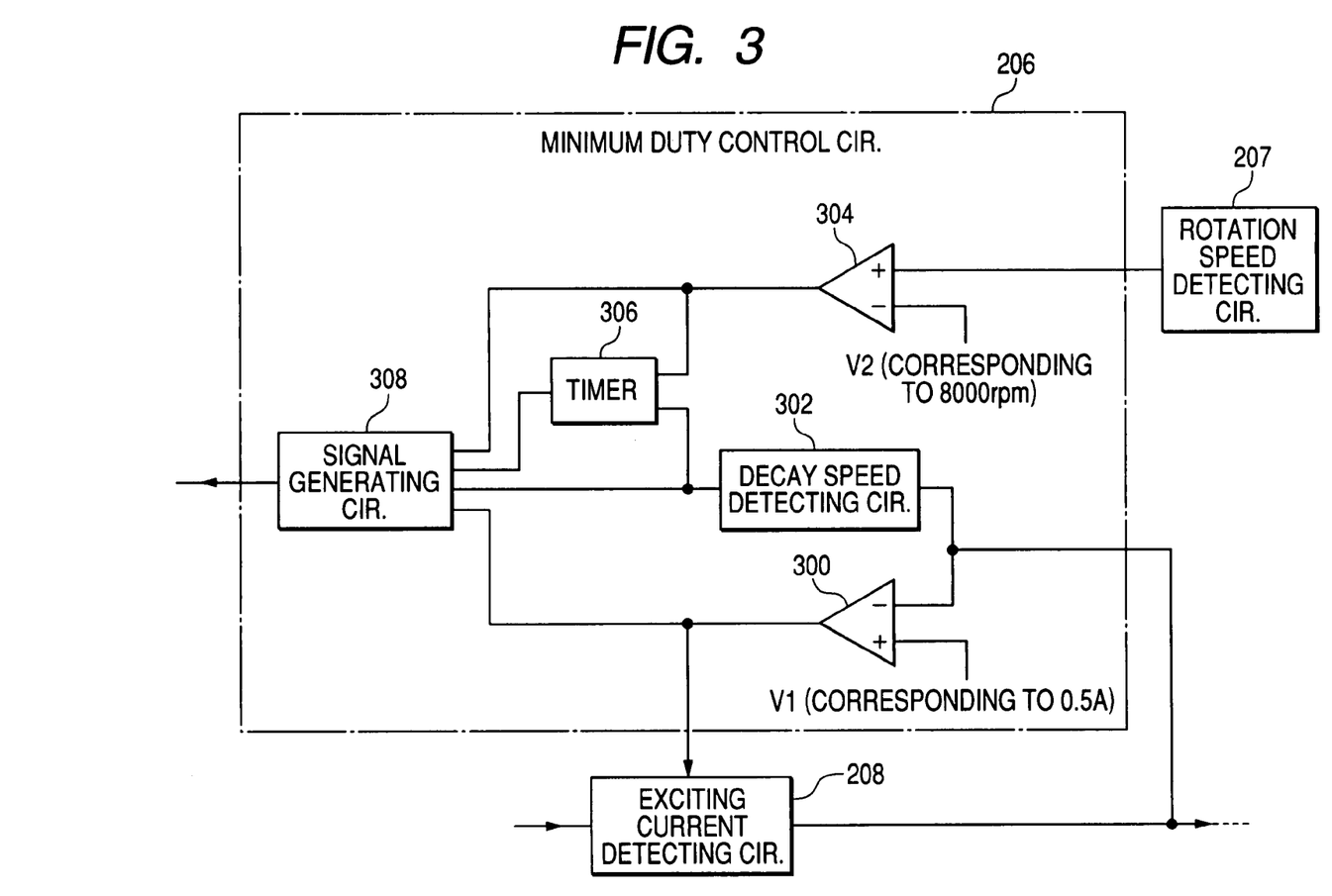
FIG. 3 is a block diagram showing the configuration of a duty ratio control circuit used in the generation control apparatus.

In the present embodiment, the transistor 202 composes a switching element; a combination of the resistor 203 and the exciting current detecting circuit composes current detecting means or a current detecting unit; a combination of the OR circuit 204 and part of the signal generating circuit 308 or 308A (or the AND circuit 312) composes driving means or a driving unit; and a combination of the remaining of the signal generating circuit 308, the voltage comparators 302 and 304, the decay speed detecting circuit 302, and the timer 306 composes setting means or a setting unit.

The generation control apparatus 2 has the arrangement described above and operates to regulate the output voltage of the generator 1.

Figure 2:
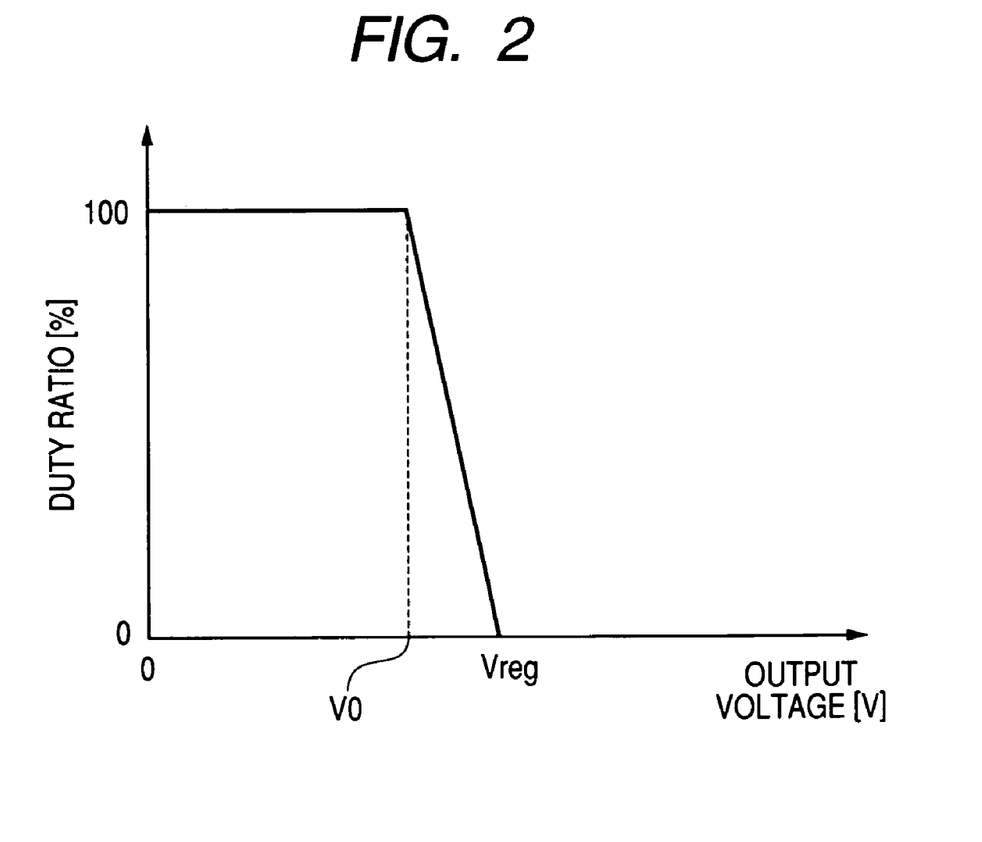
FIG. 2 is a graph showing the relationship between the duty ratio of a voltage regulation signal generated by a voltage regulating circuit and the output voltage of a generator.

How to regulate the output voltage of the generator 1 is similar to the conventional. FIG. 2 shows how to control the duty ratio (duty cycle) of the voltage control signal (i.e., the driving signal) outputted from the voltage regulating circuit 205. As illustrated, a duty ratio of 0% is set to the voltage control signal if the output voltage of the generator I is equal to or higher than a given target voltage Vreg. When the output voltage becomes less than a given voltage V0 (<Vreg), a duty ratio of 100% is specified (i.e., fully excited state). When the output voltage is between V0 and Vreg, the duty ratio is set such that it gradually increases as the output voltage decreases.

In this regulation state, when the electric load 4, which is consuming a large amount of power, is electrically disconnected from the generator 1, the output voltage of the generator 1 will rise temporarily. Hence the output voltage is kept higher than the given target voltage Vreg until the exciting current reduces fully, during which time the duty ratio of the voltage control signal to be outputted from the voltage regulating circuit 205 is set to 0%. This duty ratio of 0% is kept until the output voltage becomes less than the given target voltage Vreg.

Meanwhile, the minimum duty control circuit 206 provides an output signal as a duty signal that has a duty ratio (or duty or duty cycle) which is still controllable. This duty ratio allows the exciting current to flow at a lower limit or higher than that which is detectable by the exciting current detecting circuit 208 and is able to reduce the amplitude of the exciting current in response to a rise in the output voltage of the generator 1. Such a rise in the output voltage is given when the electric load 4 is electrically disconnected. In the present embodiment, the duty ratio corresponding to the detectable lower limit of the exciting current is set to 3% as a minimum value.

In addition to the above, the circuitry of the minimum duty control circuit 206 is ready for four duty-lowering modes under which the duty ratio is lowered than the minimum value. Predetermined conditions for the four duty-lowering modes, which are set mode by mode in advance, differ from each other and concern with the amplitude of the exciting current, the decay speed of the exciting current, the generator rotation, and a combination of the generator rotation and the time, as will be detailed later. Thus, any one of the predetermined conditions for the four duty-lowering modes (first to fourth duty-lowering modes) is met, the duty-ratio-lowering control on the designated duty-lowering mode is launched. That is, in such a case, the operation of the generation control apparatus 2 will be replaced by the duty-ratio-lowering control under the designated duty-lowering mode. Which duty-lowering mode is designated depends on how the respective predetermined conditions for the four duty-lowering modes are decided in design.

FIG. 3 depicts in detail the arrangement of the minimum duty control circuit 206. As shown, this circuit 206 is provided with two voltage comparators 300 and 304, a decay speed detecting circuit 302, a timer 306, a signal generating circuit 308.

The voltage comparator 300 has two input terminals composed of a non-inverting input terminal and an inverting input terminal, which receive a signal outputted by the exciting current detecting circuit 208 and a reference voltage V1, respectively. The reference voltage V1 corresponds to an exciting current is 0.5 A. The comparator 300 outputs a high level signal if the voltage, which is outputted from the detecting circuit 208 as a signal indicating the actually detected exciting current, is higher than the reference voltage V1. By contrast, the comparator 300 is configured to output a low level signal, If the output from the detecting circuit 208 is equal to or lower than the reference voltage V1. In other words, the comparator 300 keeps the low-level output until the exciting current reduces down to the lower limit of 0.5 A due to, for example, an electric disconnection of the electric load 4. And the comparator 300 outputs a high-level signal when the exciting current reduces and becomes less than the lower limit of 0.5 A.

he decay speed detecting circuit 302 is configured to receive the signal outputted by the exciting current detecting circuit 208 and detect a decay speed (changes in the decay) of the exciting current. In the second duty-lowering mode provided by the minimum duty control circuit 206, which will be detailed later, this circuit 302 is configured to output a low-level signal during the detected decay speed is lower than a predetermined value (during which the exciting current decays at a higher decay speed). In contrast, the circuit 302 is configured to output a high-level signal when the detected decay speed is equal to or lower than this predetermined value (i.e., when the decay speed comes closer to a saturation state thereof).

When conducting the fourth duty-lowering mode provided by the minimum duty control circuit 206, however, the decay speed detecting circuit 302 is changed in its configuration from that in the second duty-lowering mode. This change will be detailed later in the explanation of the forth duty-lowering mode.

In the present embodiment, though detailed later, the four duty-lowering modes consisting of first, second, third and fourth duty-lowering modes are prepared in the minimum duty control circuit 206, which will also be detailed later.

The voltage comparator 304 is formed to receive, at its input terminals, both of a signal indicative of the number of rotations outputted by the rotation speed detecting circuit 207 and receive a reference voltage V2. This reference voltage V2 corresponds to an output signal of the rotation speed detecting circuit 207, which is to be outputted when the number of rotations of the generator 1 is 8000 rpm serving as a reference for determining a high-speed rotation. Therefore, the voltage comparator 304 supplies, as an output, a low-level signal, in cases where the number of rotations is equal to or lower than a reference speed of 8000 rpm. The voltage comparator 304 supplies a high-level signal, in cases where the number of rotations is higher than the reference speed of 8000 rpm.

The timer 306 is structured such that it normally outputs a low-level signal. In addition, the timer 306 is able to start measuring a time interval T in synchronism with starting a reduction in the exciting current on condition that the voltage comparator 304 outputs the high-level signal. On completion of the time interval T, the timer 306 changes its output signal from the low level to the high level. As a result, in cases where the electric load 4 is electrically disconnected and the exciting current is controlled to start a reduction in the exciting current, the timer 306 keeps outputting the low-level signal until the predetermined time interval T elapses from the reduction start, and then changes its output signal to the high level.

The signal generating circuit 308 is configured to generate a duty ratio signal of either a duty ratio of 3% or a duty ratio of 1%, in response to at least one of the outputs from the voltage comparators 300 and 304, the decay speed detecting circuit 302, and the timer 306. As described, the duty ratio of 3% is the minimum value which allows the exciting current to flow at its lower limit detectable by the exciting current detecting circuit 208. Meanwhile, the duty ratio of 1%, which is a representative for all the duty ratios lower than the minimum value (i.e., 3%) in the present embodiment, is set to cause the exciting current to flow at an amount which is undetectable by the exciting current detecting circuit 208.

When all those circuits 300, 304, 302, and 306 output the low-level signals, the signal generating circuit 308 is configured to generate the duty ratio signal of a duty ratio of 3%. However, when any one of those circuits 300, 304, 302, and 306 outputs a high-level signal, the signal generating circuit 308 is configured to generate the duty ratio signal of a duty ratio of 1%. That is, the signal generating circuit 308 changes the duty ratio of its duty ratio signal from 3% to 1% in response to the transition to the high-level signal. In the present embodiment, the signal generating circuit 308 is able to respond to any of the outputs from the circuits 300, 304, 302 and 306, but accepts only the first-coming signal in preference to the others and performs the operation to change the duty ratios until the completion of the operation on the first-coming signal.

The duty ratio signal produced by the signal generating circuit 308 is provided as the driving signal from the minimum duty control circuit 206 to the generator 1.

The operations of the minimum duty control circuit 206 will now be detailed in the four duty-lowering modes which are composed of, as described, a first duty-lowering mode in which the amplitude of the exciting current is examined, a second duty-lowering mode in which the decay speed of the exciting current is examined, a third duty-lowering mode in which the number of rotations of the generator 1 is examined, and a forth duty-lowering mode in which the number of rotations of the generator 1 is examined together with time count.

(First Duty-lowering Mode)

Figure 4:
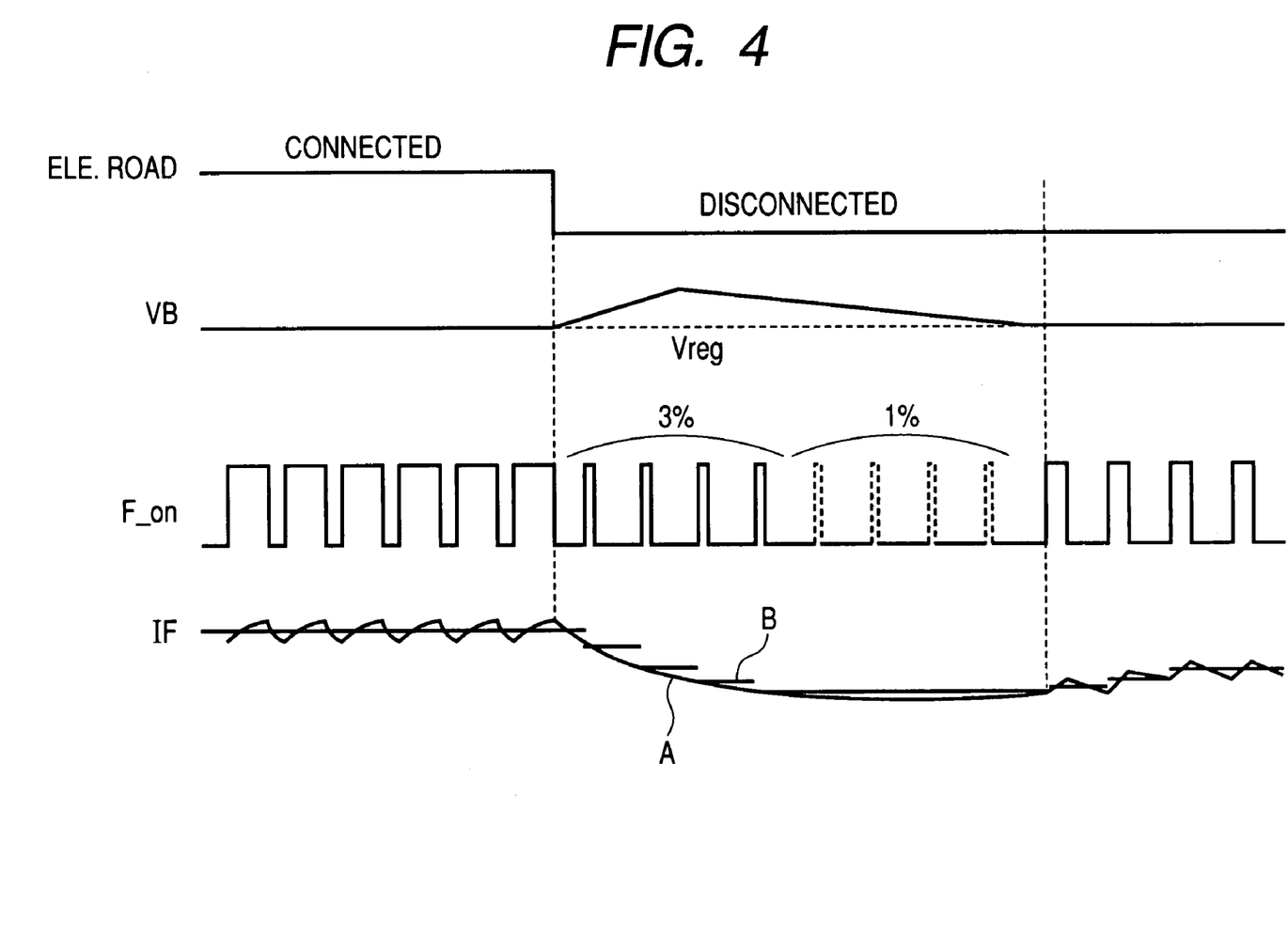
FIG. 4 is a time chart showing the operations of the generation control apparatus, which are carried out when an electric load is electrically disconnected from a generator adopted in the embodiment.
Figure 5:
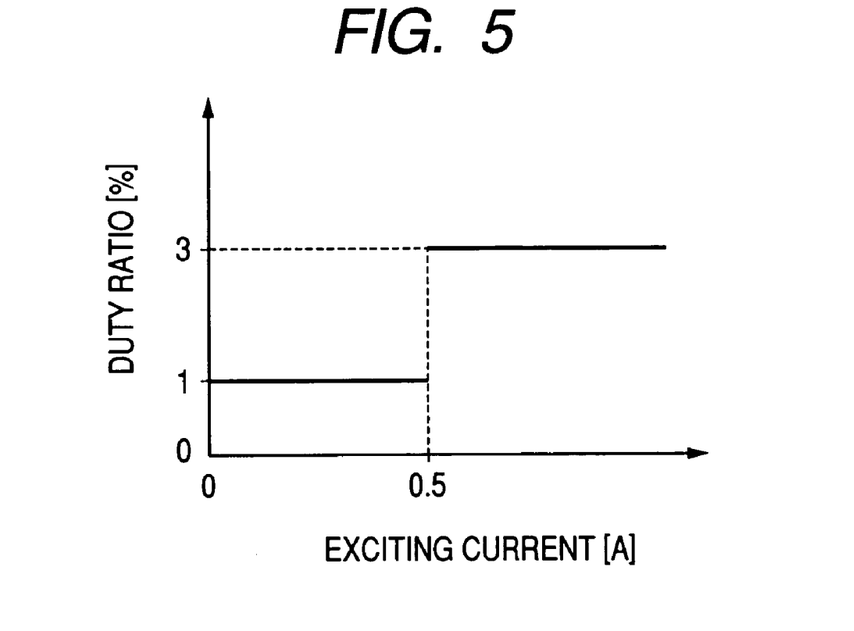
FIG. 5 is a graph showing the relationship between the duty ratio of the gate voltage (voltage regulation signal) applied to an exciting current driving transistor and the exciting current in a first duty-lowering mode.

With reference to FIGS. 3, 4 and 5, the first duty-lowering mode will now be described. In this first duty-lowering mode, both of the voltage comparator 300 and the signal generating circuit 308 are used in the circuitry of the minimum duty control circuit 206 shown in FIG. 3.

In the first duty-lowering mode, as described, the amplitude of the exciting current is examined to change the duty ratios at its minimum value corresponding to the lower limit of the exciting current.

FIG. 4 shows the relationship between an actual exciting current and a detected exciting current according to the first duty-lowering mode. In FIG. 4, a reference "elect tic load" represents a connected state (high level) and a disconnected state (low level) of the electric load 4, a reference "VB" represents the output voltage of the on-vehicle generator 1, and a reference "F_on" represents driving timing of the transistor 202 to turned on (high level) and off (low level), respectively. Further, a reference "IF" represents the exciting current to flow through the exciting current. 102, in which a reference "A" denotes an actually flowing exciting current and a reference "B" denotes the exciting current detected by the exciting current detecting circuit 208.

FIG. 5 shows the relationship between an exciting current and the duty ratio of the driving signal, which is generated by the signal generating circuit 308.

The voltage comparator 300 generates a low-level signal at a time when the electric load 4 has been electrically disconnected from the generator 1 and is about to stat decaying. Responsively to this, the signal generating circuit 308 first generates and outputs the duty ratio signal with a duty ratio of 3%. As time goes on, the exciting current decays deeply. And the exciting current finally reaches 0.5 A, with the result that the signal outputted from the voltage comparator 300 is switched from the low level to the high level. The signal generating circuit 308 responds to this switching by generating the duty ratio signal of a duty ratio of 1%. This duty signal of 1% is also kept when the exciting current becomes less than 0.5 A.

Incidentally, the lower limit is set to a higher value than a saturation value of the exciting current which is obtained by driving the driving transistor 202 with the use of the driving signal whose duty value is the minimum value, that is, 3%. As described, by way of example, the lower limit is 0.5 A.

The signal generated by the signal generating circuit 308 is fed to the driving transistor 202 as a driving signal from the minimum duty control circuit 206.

In this way, when the amplitude of the exciting current becomes equal to or less than the lower limit (i.e., 0.5 A), the duty ratio of the driving signal is also forcibly lowered than its minimum value. Lowering the duty ratio in such a way makes it possible that the output voltage of the generator 1 which has temporarily risen by an electric disconnection of the electric load 4 is reduced more rapidly.

When the exciting current becomes smaller than the lower limit, the exciting current detecting circuit 208 is unable to detect the exciting current. In this case, however, the exciting current has already been lower than the lower limit, so that an error in detecting the current is not large.

As a variation, the above situation in which the exciting current cannot be detected due to its lowering can be cured as follows. In other words, as it can be estimated that the amplitude of the actual exciting current is between zero and the lower limit, a properly selected current value can be assigned to the exciting current as an alternative. Such a proper current value is for example, half the lower limit.

Specifically, as shown in FIG. 3, the output signal of the voltage comparator 300 is fed to the exciting current detecting circuit 208 as well as the signal generating circuit 308. As long as the output of the voltage comparator 300 is in a low level, the exciting current detecting circuit 208 provides a detected signal indicative of the amplitude of the exciting current to both the minimum duty control circuit 206 and the exciting current output circuit 209. Accordingly, this output circuit 209 gives the actually detected exciting current to the ECU 5. In contrast, the output of the voltage comparator 209 switches to its high level, the output circuit 208 is able to provide the ECU 5 with the signal whose value is half the lower limit, that is, 0.25 A, instead of an unknown exciting current value which is undetectable. By employing such a properly elected current value between the lower limit and zero as an alternative exciting current, the error in detecting the exciting current can be lessened further.

(Second Duty-lowering Mode)

The second duty-lowering mode will now be described, in which both of the decay speed detecting circuit 302 and the signal generating circuit 308 are used in the circuitry of the minimum duty control circuit 206 shown in FIG. 3. These circuits 302 and 308 are cooperatively operative for determining whether or not the decay speed of the exciting current is equal to or more than a predetermined threshold and controlling the duty ratio of the driving signal depending on the determination.

In an electric disconnection of the electric load 4, the exciting current starts to reduce. When immediately after the start of the reduction, the decay speed of the exciting current is still, large, so that the decay speed detecting circuit 302 provides a low-level signal. Therefore, the signal generating circuit 308 generates a duty signal of a duty ratio of 3%, whereby the driving signal whose duty ratio is 3% is produced. The exciting current then decays as time goes on, and the exciting current approaches to its saturated value.

When the exciting current reduces down to a predetermined saturated value, the output of the decay speed detecting circuit 302 is changed to its high level. By responding to this level change, the signal generating circuit 308 produces the duty signal whose duty ratio is 1% and outputted as the driving signal to the generator 1. Thus the predetermined saturated current value can be set to, for example, 0.5 [A] or thereabouts, with the result that the same or similar operations as or to those obtained in the first duty-lowering mode can be gained.

As described, decreasing the duty ratio of the driving signal when the exciting current approaches its predetermined saturation value makes it possible the output voltage of the generator 1, which has been temporarily swelled due to the electric disconnection of the electric load 4, is lowered at a quicker speed.

The exciting current cannot be detected after it approaches its predetermined saturation value. However, the detection error is lower and has almost no influence on the control based on the driving signal, because the exciting current has reduced down to a fully small amount thereof.

(Third Duty-lowering Mode)

The third duty-lowering mode will now be described, in which both of the voltage comparator 304 and the signal generating circuit 308 are used in the circuitry of the minimum duty control circuit 206 shown in FIG. 3. These circuits 304 and 308 are cooperatively operative for determining whether or not the number of rotations of the generator 1 is equal to or less than a predetermined threshold and controlling the duty ratio of the driving signal depending on the determination.

Figure 6:
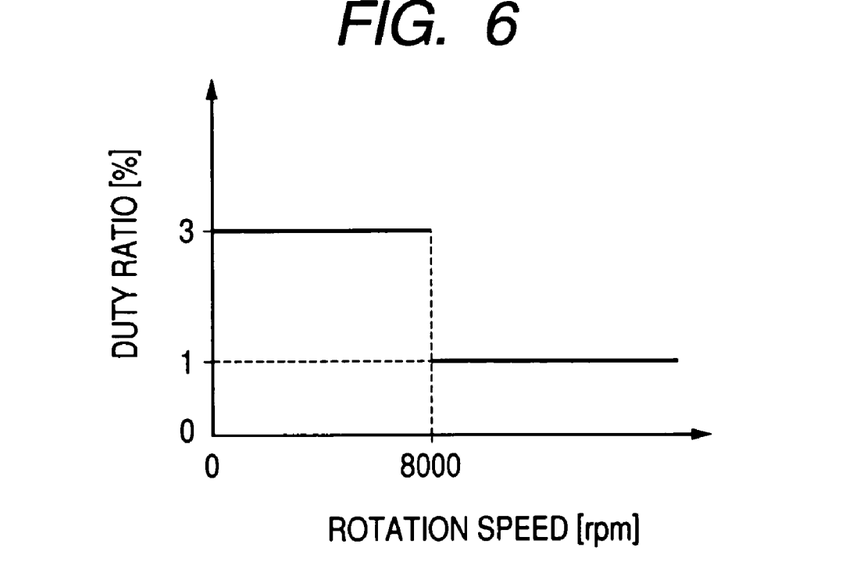
FIG. 6 is a graph showing the relationship between the duty ratio of the gate voltage (voltage regulation signal) applied to the exciting current driving transistor and the number of rotations of the generator in a third duty-lowering mode.

FIG. 6 Illustrates the relationship between the number of rotations of the generator 1 and the duty ratio (duty cycle) of the driving signal, which is used in the third duty-lowering mode.

As shown in FIG. 6, as long as the number of rotations of the generator 1 is equal to or less than a predetermined reference number (for example, 8000 rpm shown in FIG. 6), the voltage comparator 304 outputs a low-level signal. Hence the signal generating circuit 308 produces a duty signal whose duty ratio is 3% in the same way as described in the first and second duty-lowering modes.

In contrast, when the generator 1 runs in a rotation state whose number of rations exceeds the predetermined reference number (i.e., 8000 rpm), the output of the voltage comparator 304 changes from the low level to the high level. This level change makes the signal generating circuit 308 produce a duty signal whose duty ratio is 1%.

In this way, in cases where the number of rotations of the generator 1 is over the predetermined reference number, the driving signal is controlled to have a duty ratio of 1%. Therefore, the same and similar advantages as or to those described can also be provided. In the state where the duty ratio is 1%, the exciting current is no longer detected by the exciting current detecting circuit 208. However, provided that the generator 1 is in such a high-speed rotation range, the rotation of the engine is stable. Thus, even when no engine control is carried out based on a generation torque, the engine will not be brought into an unstable state.

As described, by decreasing the duty ratio of the driving signal when the generator 1 is in a high-speed rotation, the output voltage of the generator 1, which has been temporarily swelled due to the electric disconnection of the electric load 4, can be lowered at a quicker speed. In this state where the duty ratio is reduced down to 1%, for example, the exciting current cannot be detected. However, as mentioned above, the engine is in a high-speed rotation, so that it is almost unnecessary to estimate the generation torque for regulating the engine rotation by using the detected exciting current. In consequence, there is no inconvenience resulting from the fact that the exciting current cannot be detected.

(Fourth Duty-lowering Mode)

The fourth duty-lowering mode will now be described, in which the voltage comparator 304, the timer 306, and the signal generating circuit 308 are used in the circuitry of the minimum duty control circuit 206 shown in FIG. 3. These circuits 304, 306 and 308 are cooperatively operative for determining whether or not the number of rotations of the generator 1 is equal to or less than a predetermined threshold during a predetermined period of time and controlling the duty ratio of the driving signal depending on the determination.

In order to conduct such an operation in this duty-lowering mode, the decay speed detecting circuit 302 is configured such that the operations of this circuit 302 are different from those in the second duty-lowering mode. That is, this circuit 302 outputs a high-level signal only when it detects a determined decay speed of the exciting current. The timer 306 is configured to count by responding to a condition that both the outputs of the voltage comparator 304 and decay speed detecting circuit 302 become their high levels.

Figure 7:
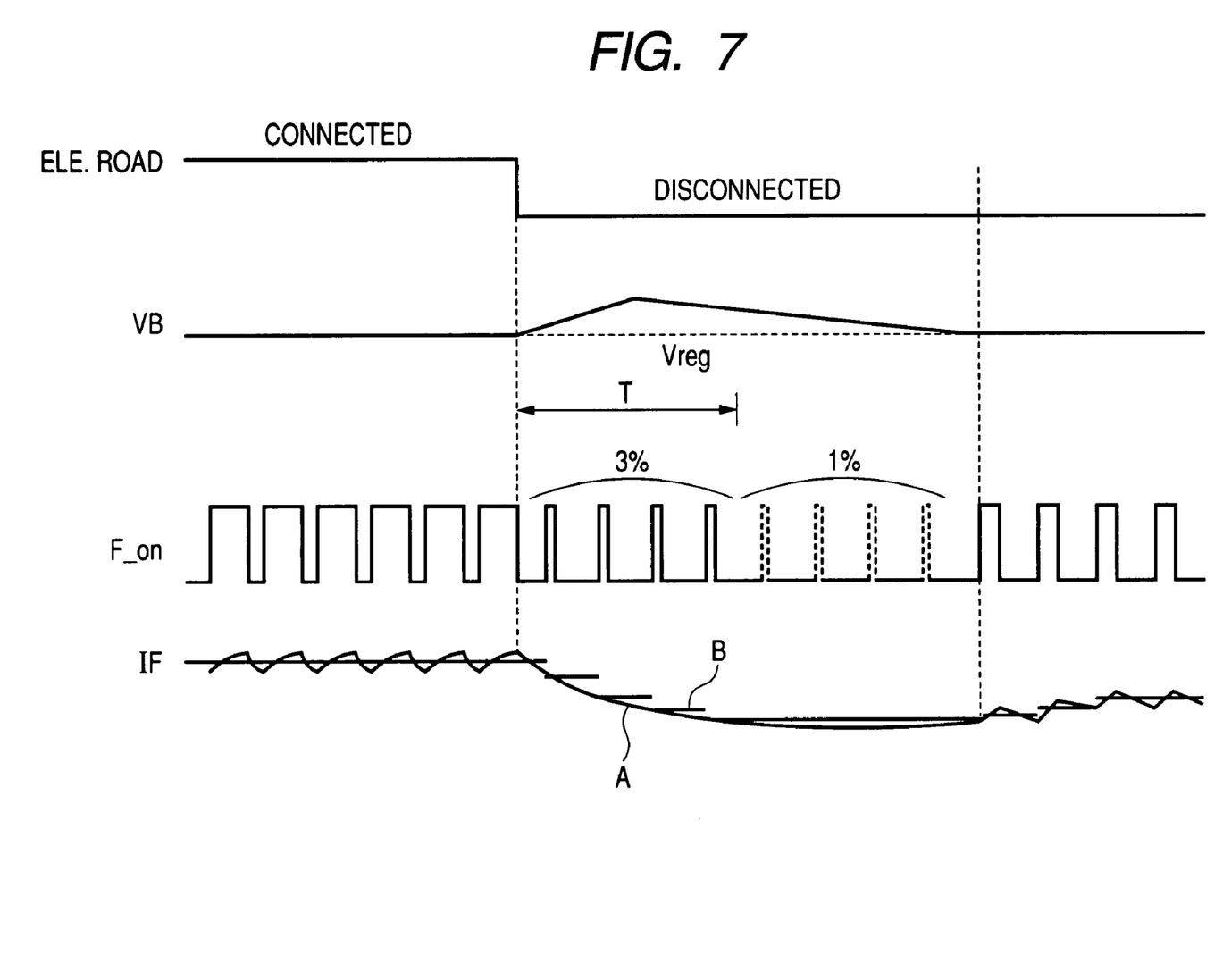
FIG. 7 is a time chart time chart showing the operations of the generation control apparatus, which are carried out when an electric load is disconnected from a generator in a fourth duty-lowering mode.

Hence, the timer 306, which receives the outputs of both the voltage comparator 304 and the decay speed detecting circuit 302, is configured to start the time measurement in response to a high-level output coming from the voltage comparator 304 and a signal, showing detection of a predetermined large decay speed of the exciting current, coming from the decay speed detecting circuit 302. And the timer 306 is configured to count a predetermined period of time T, as shown in FIG. 7, and changes its output signal from a low level to a high level when the predetermined period of time T has been measured.

That is, during a state in which the number of rotations of the generator 1 is over a predetermined reference number (for example, 8000 rpm, as described), electrically disconnecting the electric load 4 initiates the decay of the exciting current. As shown in FIG. 7, during the predetermined period of time T which follows the start of the decay of the exciting current, the output of the timer 306 is a low-level signal. Hence the signal generating circuit 308 produces a duty signal of having 3% duty ratio, so that the driving signal is set to have a duty ratio of 3%.

In response to counting the predetermined period of time T, that is, when the predetermined period of time T has elapsed after the start of decay of the exciting current, the timer 306 switches its output from the low-level signal to the high-level signal. Thus, this change in the signal levels allows the signal generating circuit 308 to produce a duty signal whose duty ratio is 1% lower than the minimum value (3% in this case). The driving signal thus is set to have a duty-ratio of 1%.

As described, when the generator 1 is in its predetermined high-speed rotation state during the predetermined period of time T, the duty ratio of the driving signal is forcibly reduced down to a small amount than the minimum value on completion of measuring the period T. Thus the output voltage of generator 1 can be prevented from lasting as an excessive voltage. Further, even when an excessive voltage will now occur by setting a duty ratio of 3% (the minimum value) to the driving signal, an electric disconnection of the electric load 4 may raise the output voltage of the generator 1. In this situation, the driving signal is set to a lower duty ratio than the minimum value, which is still effective for making the exciting current decay at a quicker speed, thereby being suppressed effectively.

In addition, when the predetermined period T has passed, the exciting current is in an almost saturated sate thereof. In such a saturated state, the amplitude of the exciting current is suppressed down to a small quantity, whereby an error in detecting the exciting current is small as well. In this state, the engine runs at a high number of rotations, so that estimating a generation torque based on the exciting current, which is carried out for regulating the engine rotation, can be avoided. That is, there is no inconvenience which stems from the fact that the exciting current cannot be detected.

(Modifications)

The present embodiment, which selectively involves the first to fourth duty-lowering modes of operations, can still be modified into various ways, which will now be explained hereinafter.

In the foregoing first to fourth duty-lowering modes, the duty ratio of the driving signal is lowered from 3% (i.e., the minimum value) to 1% less than the minimum value when any one of the predetermined four conditions defined about the generated states of the generator 1 and the electric load 4 is selectively met. Instead of 1%, the duty ratio may be lowered from 3% to 0% so as to actually stop the output of the driving signal. In the same reason as that for 1%, a duty ratio of 0% has almost no influence on detecting the exciting current and thus controlling the rotation of the engine.

Still, in place of generating the driving signal whose duty ratio is 1%, the signal generating circuit 308 may operate to stop generating the driving signal itself and output a low-level signal as a substitute for the driving signal.

Figure 8:
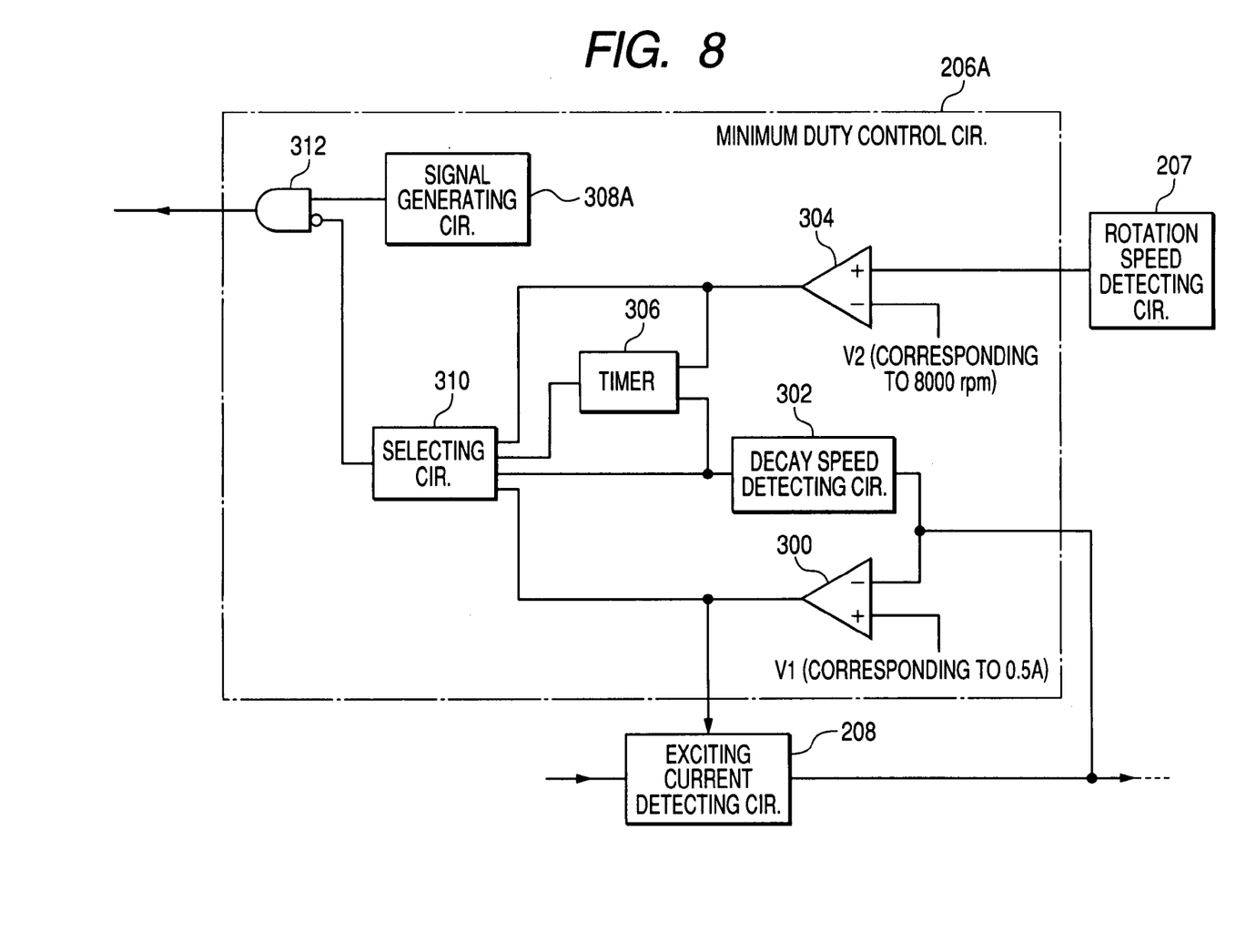
FIG. 8 is a block diagram showing the configuration of a duty ratio control circuit used in the generation control apparatus according to a modification of the embodiment.
Figure 9:
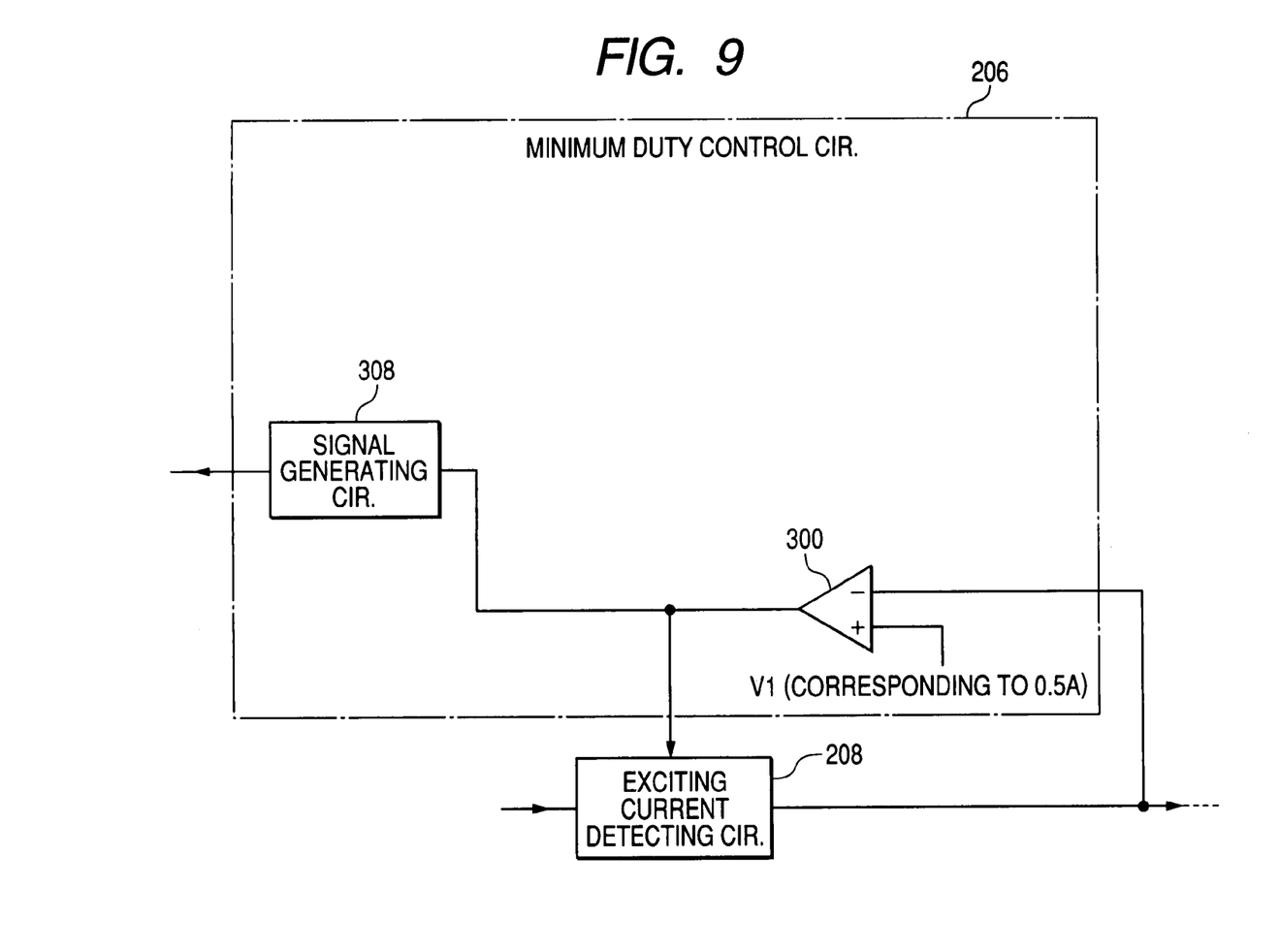
FIGS. 9 to 12 illustrate in block forms the configurations of duty ratio control circuits which can be adopted for first to fourth duty-lowering modes, respectively.
Figure 10:
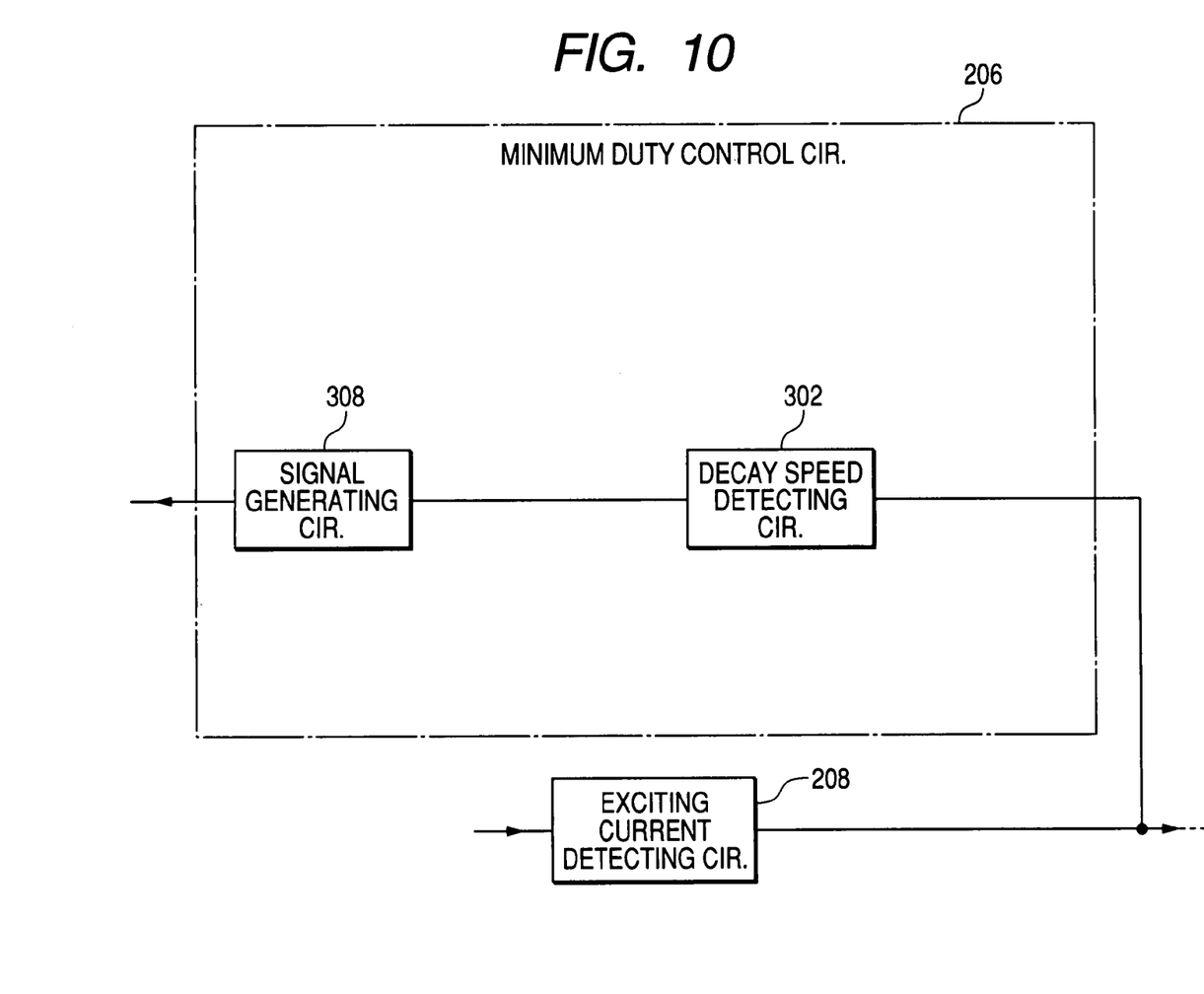
Figure 11:
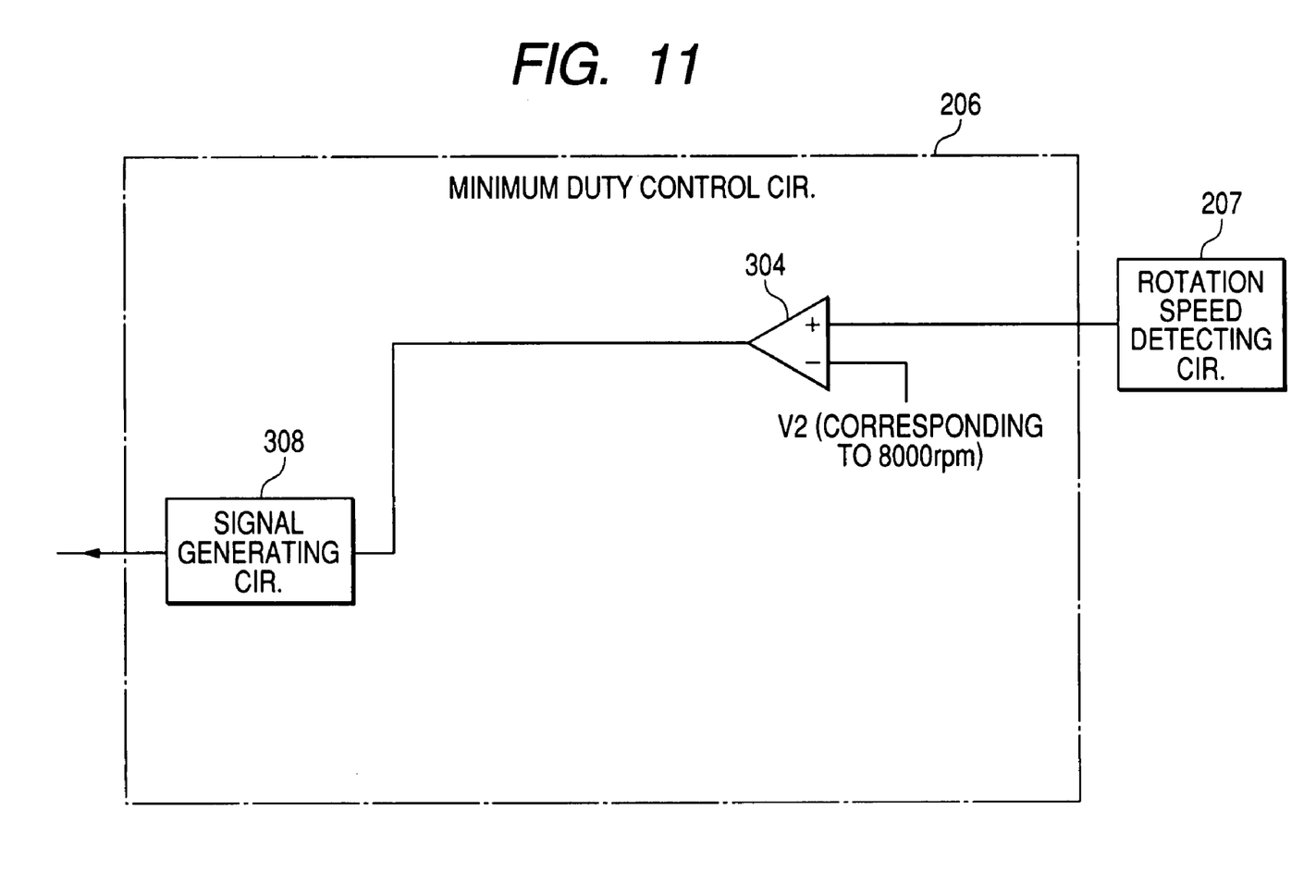
Figure 12:
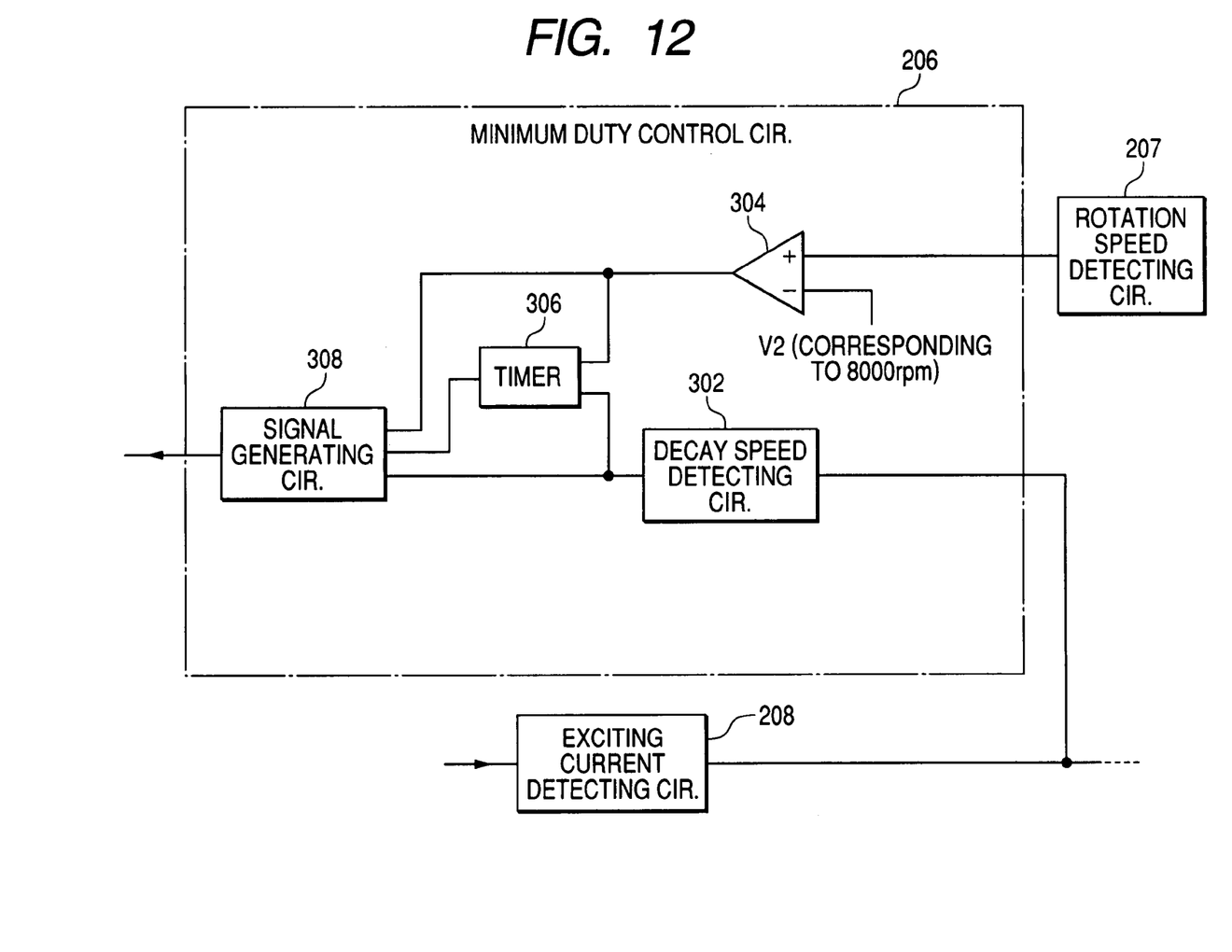

Another modification is shown in FIG. 8, in which a minimum duty control circuit 206A is used to actually stop the output of the driving signal. Specifically, a selecting circuit 310 is additionally used for selecting any one of the outputs of the voltage comparator 300, decay speed detecting circuit 302, voltage comparator 304, and timer 306, which correspond to the first to fourth duty-lowering modes, respectively The selecting circuit 312 has a one output terminal electrically connected to an inverting input terminal of an AND circuit 312, so that the selected one signal is fed to the AND circuit 312. This AND circuit 312 has also a non-inverting input terminal electrically connected to a signal generating circuit 308A. This circuit 308A is configured to provide the non-inverting input terminal of the AND circuit 312 with a duty signal whose duty ratio is always 3%. The AND circuit 312 has an output terminal electrically connected to the OR circuit 204 shown in FIG. 1.

Therefore, in the circuitry shown in FIG. 8, when any one of the predetermined foregoing conditions to start up the first to fourth duty-lowering modes is fulfilled, the selecting circuit 310 outputs a high-level signal to the AND circuit 312. This level change enables the AND circuit 312 to stop the duty signal of a 3% duty ratio to be supplied from the signal generating circuit 308A, resulting in the stop of the driving signal.

Furthermore, in the foregoing embodiment, the minimum duty control circuit 206 or 206A has been described such that it is provided with all types of the configurations which cope with the selective performance of the first to fourth duty-lowering modes. However, this is not always a definitive list, but the duty ration control circuit 206 or 206A may be provided with any one, two or three types of configurations arbitrarily selected solely or in a combined manner from the configurations for all the types of duty-lowering modes. By way of example, FIGS. 9, 10, 11 and 12 illustrate the configuration dedicated solely to each of the performance of the firsts second, third and fourth duty-lowering modes, respectively. It is enough that each configuration is able to solely perform each duty-lowering mode, whereby the circuitry can be simplified more, as shown in each of FIGS. 9 to 12

Still further, as a substitute for the on-vehicle generation control apparatus 2 according to the foregoing embodiment which is configured to regulate the output voltage of the generator 1 at a predetermined voltage value, it is also possible that a voltage correlating with the output voltage of the generator 1 is regulated at a predetermined voltage value. For instance, such a correlating voltage is a terminal voltage of the battery 3.

As to the minimum duty control circuit 206 or 206A, the circuitry may be structured, in part or as a whole, into a computer system that is provided with a CPU (central processing unit), ROM (read-only memory), RAM (random access memory) and other necessary components. Of course, the OR circuit 204, voltage regulating circuit 205 and minimum duty control circuit 206 may be formed into one or more computer systems so that they function described. It is also possible to install the foregoing functions realized in the on-vehicle generation control apparatus 2, in part or as a whole, into another control unit such as ECU 5 for engine control.

In addition, the transistor 202, which is formed by a MOS (metal oxide semiconductor) transistor in the foregoing embodiment, may be substituted, by an electromagnetic relay or any other appropriate switching element.

The present invention may be embodied in several other forms without departing from the spirit thereof. The embodiments and modifications described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. An apparatus for controlling a generator mounted on a vehicle, the generator being electrically connected to an electric load and being equipped with an exciting winding to which an exciting current is supplied for drive of the generator, the apparatus comprising:
   a switching element placed to turn on and off the exciting current to the exciting winding of the generator, the switching element being driven in response to a driving signal having an adjustable duty ratio;
   current detecting means for detecting the exciting current;
   setting means for setting the duty ratio of the driving signal on the basis of (i) a difference between a voltage value relating to an output voltage of the generator and a target voltage value and (ii) a condition in which the electric load is electrically disconnected from the generator, wherein the duty ratio is allowed to lower than a minimum value of the duty ratio depending on a generated state of the generator, the minimum value of the duty ratio allowing the exciting current to flow at a lower limit detectable by the current detecting means; and
   driving means for driving the switching element based on the driving signal set by the setting means.

2. An apparatus for controlling a generator mounted on a vehicle, the generator being electrically connected to an electric load and being equipped with an exciting winding to which an exciting current is supplied for drive of the generator, the apparatus comprising:
   a switching element placed to turn on and off the exciting current to the exciting winding of the generator, the switching element being driven in response to a driving signal having an adjustable duty ratio;
   a current detecting unit detecting information showing the exciting current;
   a setting unit setting the duty ratio of the driving signal on the basis of (i) a difference between a voltage value relating to an output voltage of the generator and a target voltage value and (ii) a condition in which the electric load is electrically disconnected from the generator, wherein the duty ratio is allowed to lower than a minimum value of the duty ratio depending on a generated state of the generator, the minimum value of the duty ratio allowing the exciting current to flow at a lower limit detectable by the current detecting unit; and
   a driving unit driving the switching element based on the driving signal set by the setting unit.

3. The apparatus of claim 2, wherein the generated state of the generator, which is reflected in setting the duty ratio of the driving signal that is set by the setting unit, is at least one of the exciting current, a decay speed of the exciting current and the number of rotations of the generator.

4. The apparatus of claim 2, wherein the voltage value relating to the output voltage of the generator is either the output voltage itself or a voltage that has a correlation with the output voltage.

5. The apparatus of claim Z, wherein the setting unit includes means for determining whether or not the exciting current is smaller than the lower limit value and means for performing either a reduction in the duty ratio of the driving signal down to a value lower than the minimum value or a stop of the driving signal, in cases where it is determined that the exciting current is smaller than the lower limit value.

6. The apparatus of claim 5, wherein the lower limit is higher a saturation value of the exciting current obtained in cases where the switching element is driven by the driving signal whose duty is set to the minimum value.

7. The apparatus of claim 5, further comprising means for determining whether or not the exciting current is lower than the lower limit thereof and means for outputting an alternative current whose value is lower than the lower limit thereof and higher than zero in cases where it is determined that that the exciting current is lower than the lower limit thereof.

8. The apparatus of claim 2, wherein the setting unit includes means for determining whether or not the exciting current is smaller than the lower limit value and means for performing either a reduction in the duty ratio of the driving signal down to a value lower than the minimum value or a stop of the driving signal, in cases where it is determined that the exciting current is smaller than the lower limit value.

9. The apparatus of claim 8, wherein the lower limit is higher a saturation value of the exciting current obtained in cases where the switching element is driven by the driving signal whose duty is set to the minimum value.

10. The apparatus of claim 8, further comprising means for determining whether or not the exciting current is lower than the lower limit thereof and means for outputting an alternative current whose value is lower than the lower limit thereof and higher than zero in cases where it is determined that that the exciting current is lower than the lower limit thereof.

11. The apparatus of claim 2, further comprising a decay speed determining unit determining whether or not a decay speed of the exciting current is equal to or more than a predetermined value, wherein the setting unit includes means for setting the duty ratio of the driving signal to the minimum value, in cases where it is determined that the decay speed of the exciting current is equal to or more than the predetermined value; and means for performing either a reduction in the duty ratio of the driving signal down to a value lower than the minimum value or stop of the driving signal, in cases where it is determined that the decay speed of the is lower than the predetermined value.

12. The apparatus of claim 2, further comprising a rotation speed detecting unit detecting the number of rotations of the generator; and a determination unit determining wither or not the number of rotations is equal to or more than a predetermined value, wherein the setting unit includes means for setting the duty ratio of the driving signal to the minimum value, in cases where it is determined that the number of rotations is equal to or more than the predetermined value;

means for performing either a reduction in the duty ratio of the driving signal down to a value lower than the minimum value or a stop of the driving signal, in cases where it is determined that the number of rotations is larger than the predetermined value.

13. The apparatus of claim 2, further comprising a rotation detecting unit detecting the number of rotations of the generator; and a determination unit determining wither or not the number of rotations is equal to or more than a predetermined value, wherein the setting unit includes means for setting the duty ratio of the driving signal to the minimum value during a period of time, in cases where it is determined that the number of rotations is equal to or more than the predetermined value;

means for reducing the duty ratio of the driving signal down to a value lower than the minimum value or a stop of the driving signal, in cases where it is determined that the number of rotations is larger than the predetermined value.

* * * * *